United States Patent
Gerber

(10) Patent No.: US 6,964,543 B2
(45) Date of Patent: Nov. 15, 2005

(54) APPARATUS AND METHOD FOR CONVEYING AND VACUUMING FIBROUS INSULATION MATERIAL

(76) Inventor: Milton L. Gerber, 818 S. Prentiss Bay, P.O. Box 427, Cedarville, MI (US) 49719

(*) Notice: Subject to any disclaimer, the term of this patent is extended or adjusted under 35 U.S.C. 154(b) by 0 days.

(21) Appl. No.: 10/692,180

(22) Filed: Oct. 23, 2003

(65) Prior Publication Data
US 2005/0089378 A1 Apr. 28, 2005

(51) Int. Cl.$^7$ ............................................. B65G 51/16
(52) U.S. Cl. ........................ 406/14; 406/30; 406/113; 406/117; 406/151
(58) Field of Search ........................... 406/14, 30, 113, 406/117, 151

(56) References Cited

U.S. PATENT DOCUMENTS

| | | |
|---|---|---|
| 3,861,599 A | 1/1975 | Waggoner |
| 4,076,321 A | 2/1978 | Haight et al. |
| 4,111,493 A | 9/1978 | Sperber |
| 4,128,404 A | 12/1978 | Stamatiou et al |
| 4,136,911 A | 1/1979 | Husges et al. |
| 4,191,224 A | 3/1980 | Bontrager et al |
| 4,353,667 A * | 10/1982 | Mandl et al. .................. 406/29 |
| 4,365,762 A | 12/1982 | Hoshall |
| 4,447,249 A | 5/1984 | Kopena |
| 4,480,947 A * | 11/1984 | Nagasaka ..................... 406/14 |
| 4,492,534 A | 1/1985 | Miyaki et al. |
| 4,560,307 A | 12/1985 | Deitesfeld |
| 4,607,987 A | 8/1986 | Kice |
| 4,798,516 A | 1/1989 | Jagst et al. |
| 5,322,074 A | 6/1994 | Cross, Jr. |
| 5,403,128 A | 4/1995 | Thomas |
| 5,487,624 A * | 1/1996 | Toyota et al. .................. 406/14 |
| 5,511,730 A | 4/1996 | Miller et al. |
| 5,639,033 A | 6/1997 | Miller et al. |
| 5,722,801 A | 3/1998 | Mahoney, Jr. |
| 5,765,728 A | 6/1998 | Simpson et al. |
| 5,934,476 A | 8/1999 | Roe |
| 6,089,378 A | 7/2000 | Mascheretti et al |
| 6,092,747 A | 7/2000 | Gerber et al. |
| 6,197,080 B1 | 3/2001 | Rubenach |
| 6,364,579 B1 | 4/2002 | Gerber |
| 6,588,988 B2 * | 7/2003 | Zlotos ......................... 406/14 |

* cited by examiner

Primary Examiner—Joe Dillon, Jr.
(74) Attorney, Agent, or Firm—George Pappas

(57) ABSTRACT

A method and apparatus for conveying and vacuuming fibrous insulation material. A blower provides an air flow stream through an insulation feeder and a conveying hose for application of the insulation. The air flow stream velocity is selectively controlled responsive to a velocity sensor and/or a pressure sensor between the blower and insulation feeder. Preferably, an air valve connected between the blower outlet and the atmosphere is controlled responsive to the velocity sensor for thereby adjusting and controlling the air flow stream velocity. The insulation feed rate is controlled in response to the air flow pressure between the blower and feeder. An air separator and vacuum hose are selectively connected to the blower inlet such that the blower provides both an air vacuum flow stream through the separator and vacuum hose and a conveying air flow stream through the insulation feeder and conveying hose. An air vacuum valve selectively allows atmospheric air to enter into the blower inlet thereby controlling the vacuum air flow stream.

25 Claims, 5 Drawing Sheets

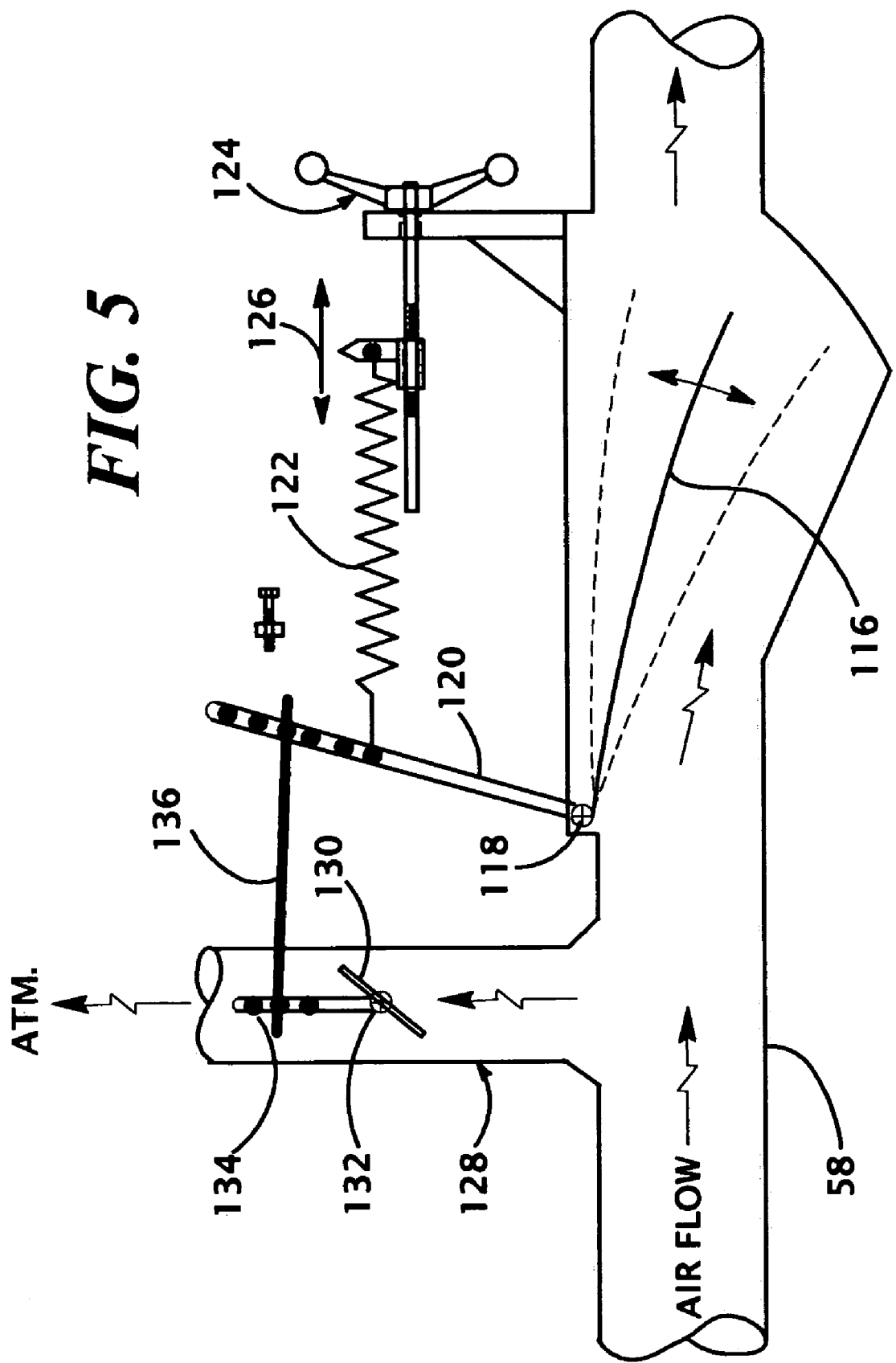

APPARATUS AND METHOD FOR CONVEYING AND VACUUMING FIBROUS INSULATION MATERIAL

TECHNICAL FIELD

The present invention relates to the technical field of conveying fibrous insulation material for application as insulation and vacuuming excess fibrous insulation for reuse. More particularly, the present invention is directed to an apparatus and method for more accurately controlling the conveyance of the fibrous insulation material for application thereof as insulation and, further, wherein a blower providing the air flow stream for conveying the fibrous insulation material also provides a vacuum for simultaneously vacuuming excess insulation material for reuse.

BACKGROUND OF THE INVENTION

Fibrous materials such as, wool, wood, paper, rockwool, fiberglass and cellulose, including cellulose made from recycled newspapers and other paper, are today commonly used for insulating buildings, homes and other structures and things. The fibrous material is typically conveyed through air hoses wherein the air travels at a sufficiently high velocity for carrying the fibrous insulation material therethrough and to the location being insulated such as, for example, attics and walls. Essentially, the fibrous material is mixed or is otherwise introduced into the high velocity air stream traveling through the hose such that the fibrous material is carried through the hose and to the location being insulated.

When insulating a horizontal surface such as an attic floor, the operator directs the air and fibrous insulation toward the cavities being filled, for example, between joists, such that, as the air exiting the hose dissipates, the fibrous insulation settles into the cavity being insulated. In some horizontal applications water is injected into the conveying hose near the machine to activate dry adhesives mixed with the insulation fibers to form a stabilized homogeneous mat in attac areas. For insulating vertical surfaces such as in stud wall cavities, an adhesive is used for causing the fibrous insulation material to essentially be adhered or stick to the surface where needed and to also stick to other fibrous insulation so as to build up the insulation material to a desired thickness. In this regard, an adhesive mist can be sprayed near the insulation conveying hose exit opening such that as the insulation travels from the end of the hose to the vertical surface it is mixed with the adhesive causes the insulation to stick as needed. Alternatively, dry adhesives are mixed and conveyed with the fibrous insulation through the conveying hose and a proper catalyst mist, typically water, is provided at the end of the hose such that the dry adhesive will react with the catalyst and provide adhesion for causing the fibrous insulation material to again stick to the vertical surface and/or itself for building up the insulation material to a sufficient desired thickness.

As can be appreciated, for the operator to properly direct and apply the fibrous insulation as it is exiting the conveying hose, the velocity of the air and insulation mixture must be correct and the conveying system and hose should not be subject to plugging. In this regard, to maximize efficiency, it is desirable to convey the greatest possible amount of insulation per given volume of air. However, if the operator attempts to convey too much insulation such that the air velocity is insufficient, the conveying hose and other parts of the system are subject to plugging and the applied density of the insulation can be adversely affected. On the other hand, if the air velocity is too great, the operator is unable to control the placement of the insulation causing, as it is referred to in the industry, a "dust storm". Additionally, in the event the insulation is being placed on vertical surfaces, insulation traveling at the higher velocity tends to be more densely packed as it is built up to the desired thickness, causing the application cost to increase and the insulation value to decrease.

Achieving the proper air to insulation mixture and rate of delivery of the insulation is yet further complicated by the fact that fibrous insulation feeders are unable to always provide a perfect air to insulation feed rate and mixture; the friction loses in the conveying hose change as the conveying hose length is increased or decreased as needed by the operator; the required head pressure for conveying the insulation through the hose changes as the operator moves the exit opening of the conveying hose vertically up and down and/or between floors of a building or house, etc.

A schematic diagram of a prior fibrous insulation conveying system is shown in FIG. 1 and generally designated by the numeral 10. Prior art conveying system 10 includes a blower 12 drawing air from the atmosphere at its inlet 14 and providing an air flow stream under pressure at its outlet 16. Outlet 16 is typically connected via a duct 18 and a directional check valve 20 to a fibrous insulation feeder 22. The fibrous insulation feeder 22 includes an air inlet 24, a product inlet 26 for receiving fibrous insulation, and an air and product mixture outlet 28 connected to a conveying hose 30. A slide gate 32 is provided for selectively setting the rate of product being fed into the airflow stream and out through the air and product mixture outlet 28. A pressure relief valve 34 and an air bleed valve 36 are connected between the air flow duct 18 and the atmosphere. Air bleed valve 36 includes a handle 38.

For use of the prior art fibrous insulation conveying system 10, the operator initially engages the blower 12 and then adjusts the handle 38 of air bleed valve 36 for setting the desired air flow velocity. The slide gate 32 is then set to a fixed position for a desired insulation feed rate. However, in view of the varying resistance and other variables, any significant back pressure that may be experienced in the conveying hose 30 causes plugging and substantial amounts of down time for cleaning and resetting the system. To decrease plugging, operators are left with no alternative but to reduce the average material feed rate which, unfortunately, results in underutilization of the equipment capacity and decreased efficiency in the application of the insulation.

Some of the problems-associated with the prior art fibrous insulation conveying systems of the character shown in FIG. 1 were addressed in prior U.S. Pat. No. 6,092,747. The conveying machine of that patent includes a variable speed blower for providing the operator additional control in adjusting the air flow velocity. Additionally, the pressure in the air flow duct between the blower and feeder is monitored and, in response thereto, the insulation feed rate is controlled thereby helping to prevent plugging of the conveying hose and system. Although this conveying machine is a significant improvement, the maximum insulation feed rate is limited by the preset air flow velocity and, to prevent possible plugging as a result of varying resistance or back pressure in the conveying hose, it has been found that operators, nevertheless, reduce the feed rate sufficiently for the preset desired air flow velocity thereby, again, resulting in underutilization of the equipment and decreased efficiency in the application of the insulation.

When applying fibrous insulation material to vertical surfaces such as vertical stud wall cavities, as the insulation is built up, the resulting outer surface is rough and not level with the inner stud edges or face. The resulting rough insulation surface is typically leveled to the stud face and the excess removed material falls to the floor wherefrom it is recovered and reused. This excess fibrous material is typically vacuumed, separated from the air, and then reused alone or by mixing with virgin fibrous insulation and running such material back through the insulation feeder. A vacuum and separator system of this character is shown, for example, in U.S. Pat. No. 6,364,579. When insulating, a conveying system of the character shown in prior U.S. Pat. No. 6,092,747 and a vacuum and separating system of the character shown in U.S. Pat. No. 6,364,579 are typically simultaneously used side by side.

Accordingly, a need exists for fibrous insulation conveying systems which continuously maximize the insulation feed rate while providing the operator the desired control of the air flow velocity and feed rate for the particular application while preventing plugging and, further, providing a system for conveying and vacuuming fibrous insulation material efficiently and relatively inexpensively.

SUMMARY OF THE INVENTION

It is the principal object of the present invention to overcome the above discussed disadvantages associated with prior fibrous insulation material conveying and vacuuming systems.

Further objects of the present invention include providing adjustable precision and automatic air flow control in pneumatic fibrous insulation material conveying systems; providing an air control method compatible with fixed speed blowers; providing a constant air conveying velocity for various fibrous insulation feed rates; providing control of the insulation feed rate as well as the conveying air flow velocity; providing a conveying and vacuum system which is easily controlled by the operator; providing a conveying system that continuously maximizes the conveying equipment output rate; providing various conveying air flow velocities controlled by the operator for use in different environments and applications; providing multiple variable controlled air flow rates from one or more constant air sources; and, providing an integral conveying and vacuuming system.

The present invention overcomes the disadvantages associated with prior conveying and vacuuming systems and achieves the foregoing and other objectives, in general, by providing an air flow velocity sensor in the air flow stream between the blower and the fibrous insulation feeder and controlling the air flow stream velocity in response to a differential between the actual and the desired air flow stream velocities.

Preferably, an air valve is provided between the blower outlet and the insulation feeder air inlet and the air valve communicates with the atmosphere and is selectively controlled responsive to the air flow velocity sensor by selectively allowing air from the air flow stream to escape to the atmosphere thereby controlling the actual insulation conveying air flow stream velocity. In the alternative, a variable speed blower is provided and the blower speed is selectively controlled in response to the differential between the actual and desired air flow stream velocity for thereby selectively adjusting and providing a desired actual insulation conveying air flow stream velocity. Preferably, the velocity sensor includes a metering orifice in the air flow stream between the blower outlet and the feeder air inlet and pressure sensors downstream and upstream of the metering orifice, and the air flow stream velocity is determined by comparing the values of the downstream and upstream air flow stream pressures. In an alternate embodiment, the air flow velocity sensor includes a sensing vane in the air flow stream adapted to proportionally deflect in response to increasing air flow velocity for thereby determining the actual air stream flow velocity and adjusting as needed.

The fibrous insulation feeder is preferably provided with an automated slide gate for selectively controlling the rate at which the fibrous insulation material is introduced into the air flow stream. The automated slide gate is selectively controlled responsive to the velocity and/or the pressure in the air flow stream between the blower and the feeder.

An integrated conveying and vacuum system is preferably provided by connecting a fibrous insulation material separator to the blower inlet such that a single blower provides both the vacuum air stream to the separator and the conveying pressurized air flow stream to the insulation feeder. The separator outlet is connected to the blower inlet and a vacuum hose is connected to the separator inlet such that vacuumed fibrous insulation is separated from the vacuum air stream and generally clean air is provided at the inlet of the blower. Accordingly, the system provides for both conveying and applying the fibrous insulation and simultaneous vacuuming of excess insulation with the same system and blower.

Preferably an air vacuum valve is connected between the blower inlet and the atmosphere and it is selectively closed for energizing and using the separator and vacuum system and opened when the air separator and vacuum system is not needed. Additionally, a vacuum sensor is provided between the blower inlet and the separator outlet and the air vacuum valve is selectively controlled responsive to the vacuum sensor in the air vacuum flow stream and/or the velocity or pressure in the conveying air flow stream. As can be appreciated by selectively controlling the velocity of the conveying air flow stream, the velocity of the vacuum air flow stream, and the rate at which the fibrous insulation material is introduced into the air flow stream at the feeder, the operators applying the insulation and vacuuming the excess insulation are provided with maximum control as desired for the particular application while maintaining a maximum desired insulation feed rate.

A vacuum relief valve is provided at the air blower inlet for selectively providing atmospheric air to the air blower inlet in the event a predetermined vacuum is exceeded, for example, in the event the separator or vacuum hose become plugged. A pressure relief valve is also provided at the air blower outlet for selectively allowing air from the conveying air flow stream to escape to the atmosphere in the event a predetermined pressure is exceeded, such as in the event the feeder or conveying hose become plugged. For providing the operator with maximum control, a programmable logic controller and a touch screen interface connected to the programmable logic controller are provided and are electrically connected between the sensors and the air and vacuum valves actuators and the feeder actuator for controlling the valves and feeder actuator responsive to the sensors and as desired by the operator.

In one form thereof, the present invention is directed to a method of conveying fibrous insulation material including the steps of providing an air flow stream and selectively introducing fibrous insulation material into the air flow stream whereby the material can be selectively conveyed for application as insulation, sensing the actual air flow stream velocity, and comparing the actual air flow stream velocity with a desired air stream velocity and selectively adjusting the air flow stream in response to a differential between the actual and the desired air flow stream velocities.

In one form thereof, the present invention is directed to a method of conveying fibrous insulation material including the steps of providing an air flow stream and selectively introducing fibrous insulation material into the air flow stream, whereby the material can be selectively conveyed for application as insulation, sensing the actual pressure in the air flow stream and comparing the actual air flow stream pressure with a desired air stream pressure and selectively adjusting the air flow stream in response to a differential between the actual and the desired air flow stream pressures.

In another form thereof, the present invention is directed to a method of conveying and vacuuming fibrous insulation material including the steps of providing an air flow stream downstream of a blower and an air vacuum stream upstream of the blower, selectively introducing fibrous insulation material into the air flow stream thereby conveying the material for application as insulation, vacuuming fibrous insulation material with the air vacuum stream, and separating the vacuumed material from the air vacuum stream prior to the air vacuum stream entering the blower.

In one form thereof, the present invention is directed to an apparatus for conveying fibrous insulation material. The apparatus includes an air blower having an air inlet and an air outlet. The blower draws air through the air inlet and provides an air flow stream at the air outlet. A feeder having a fibrous insulation material inlet, an air inlet connected to the blower outlet and a material and air mixture outlet is provided whereby fibrous insulation material is selectively introduced into the air flow stream and is conveyed out through the material and air mixture outlet for application as insulation. An air flow pressure sensor is provided between the blower outlet and the feeder air inlet. An air valve is provided between the blower outlet and the feeder air inlet and communicates with the atmosphere. The air valve is selectively controlled responsive to the air flow pressure sensor whereby the air flow delivered to the feeder is selectively controlled.

In another form thereof, the present invention is directed to an apparatus for conveying fibrous insulation material and includes an air blower having an air inlet and an air outlet. The blower draws air through the air inlet and provides an air flow-stream at the air outlet. A feeder is provided having a fibrous insulation material inlet, an air inlet connected to the air blower outlet and a material and air mixture outlet. The fibrous insulation material is selectively introduced into the air flow stream and is conveyed out through the material and air mixture outlet for application as insulation. An air flow velocity sensor, is provided between the blower outlet and the feeder air inlet. An air valve is provided between the blower outlet and the feeder air inlet and the air valve communicates with the atmosphere and is selectively controlled responsive to the air flow velocity sensor such that the air flow delivered to the feeder is selectively controlled.

In one form thereof, the present invention is directed to an apparatus for conveying and vacuuming fibrous insulation material and includes an air blower having an air inlet and an air outlet. The blower provides an air vacuum stream at the air inlet and an air flow stream at the air outlet. A feeder is provided having a fibrous insulation material inlet, an air inlet connected to the air blower outlet and a material and air mixture outlet such that fibrous insulation material is selectively introduced into the air flow stream and is conveyed out through the material and air mixture outlet for application as insulation. A fibrous insulation material separator is provided having an air and material mixture inlet, a material outlet and an air outlet connected to the inlet of the air blower. A vacuum is provided at the separator air and material mixture inlet wherethrough fibrous insulation material is vacuumed. The air blower provides both an air vacuum stream through the separator and an air flow stream to the feeder.

In one form thereof, the present invention is directed to an apparatus for conveying fibrous insulation material and includes a variable speed air blower having an air inlet and an air outlet. The blower draws air through the air inlet and provides an air flow stream at the air outlet. A feeder is provided having a fibrous insulation material inlet, an air inlet connected to the air blower outlet and a material and air mixture outlet whereby fibrous insulation material is selectively introduced into the air flow stream and is conveyed out through the material and air mixture outlet for application as insulation. An air flow velocity sensor is provided between the blower outlet and the feeder inlet and the speed of the blower is controlled responsive to the air flow velocity sensor such that the air flow delivered to the feeder is selectively controlled.

In yet another form thereof, the present invention is directed to an apparatus for conveying fibrous insulation material and includes a variable speed air blower having an air inlet and an air outlet and drawing air through the air inlet and providing an air flow stream at the air outlet. A feeder is provided having a fibrous insulation material inlet, an air inlet connected to the air blower outlet and a material and air mixture outlet whereby fibrous insulation material is selectively introduced into the air flow stream and is conveyed out through the material and air mixture outlet for application as insulation. An air flow pressure sensor is provided between the blower outlet and the feeder air inlet and the speed of the blower is controlled responsive to the air flow pressure sensor such that the air flow delivered to the feeder is selectively controlled.

BRIEF DESCRIPTION OF THE DRAWINGS

The above mentioned and other features and objects of this invention and the manner of obtaining them will become more apparent and the invention itself will be better understood by reference to the following description of embodiments of the invention taken in conjunction with the accompanying drawings wherein.

Corresponding reference characters indicate corresponding parts throughout the several views of the drawings.

The exemplifications set out herein illustrate preferred embodiments of the invention in one form thereof and such exemplifications are not to be construed as limiting the scope of the disclosure or the scope of the invention in any manner.

DETAILED DESCRIPTION OF SPECIFIC EMBODIMENTS

Figure 1:
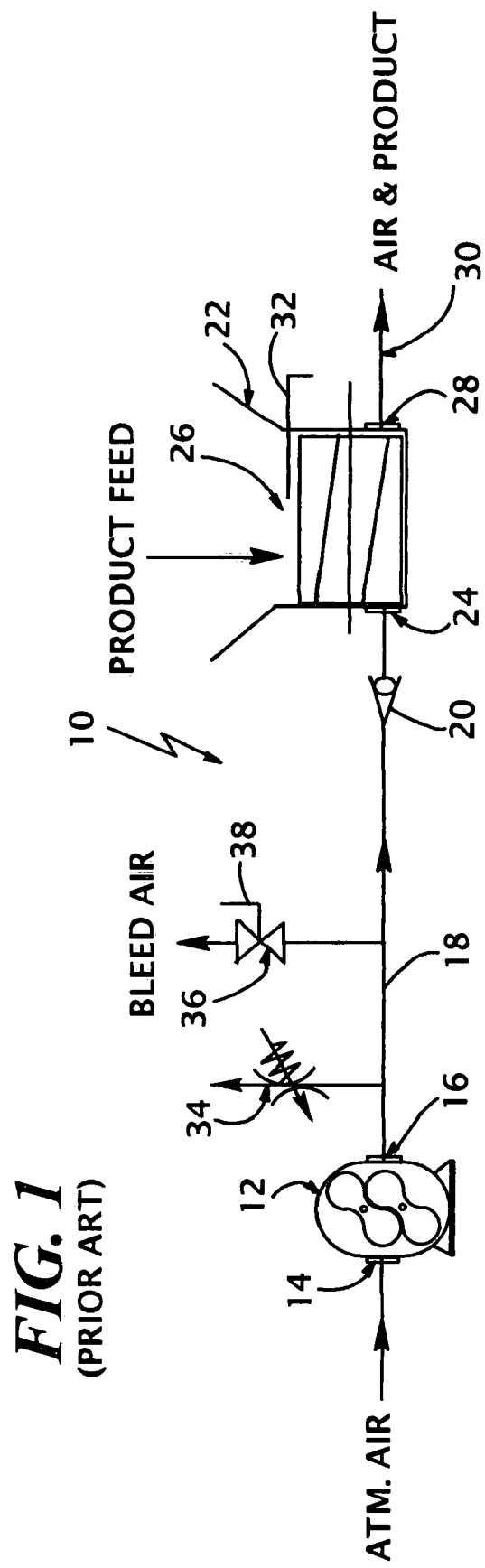
FIG. 1 is a schematic diagram of a prior art fibrous insulation conveying system.
Figure 2:
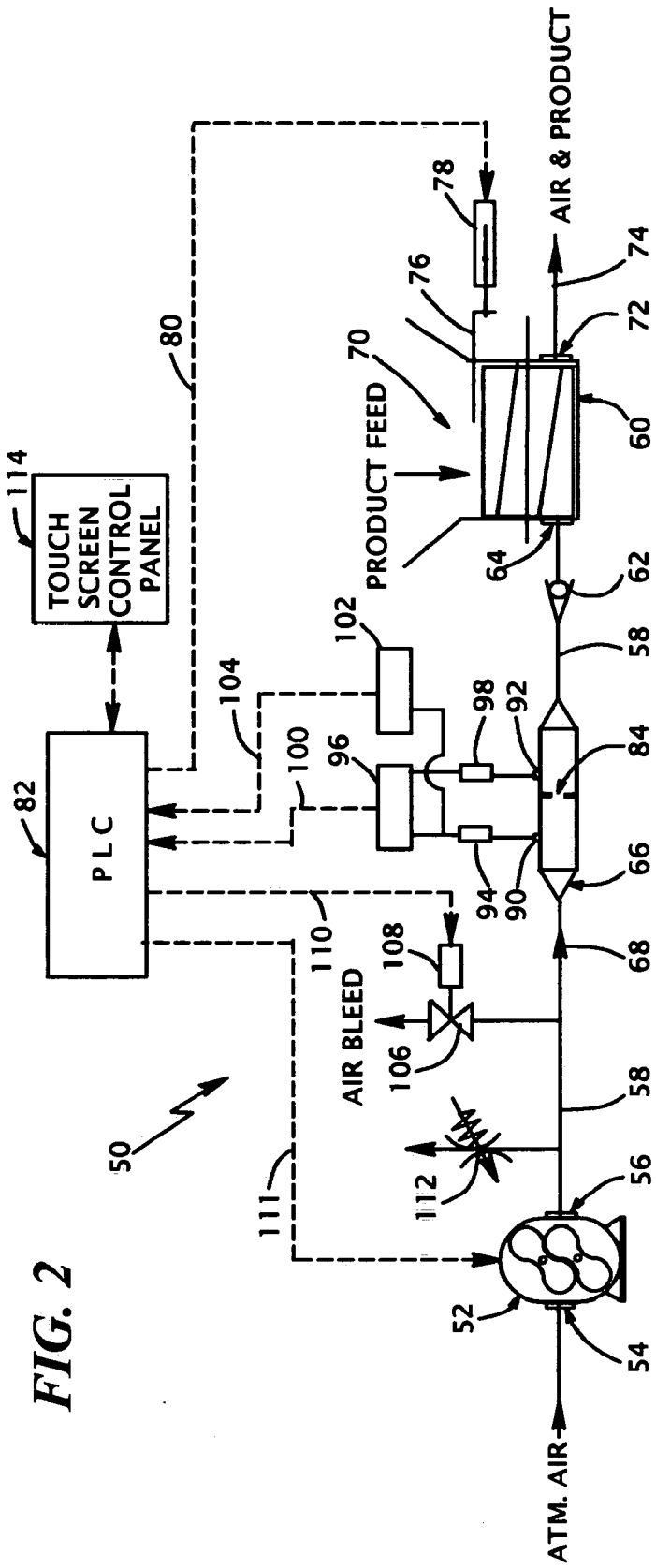
FIG. 2 is a schematic diagram of a fibrous insulation conveying system constructed in accordance with the principles of the present invention.

Referring initially to FIG. 2, there is shown a schematic diagram of a fibrous insulation conveying system constructed in accordance with the principles of the present invention and generally designated by the numeral 50. The conveying system 50 is adapted for use in conveying fibrous insulation such as wool, wood, paper, cellulose, rock wool, fiberglass, etc., and for application of insulation fill such as in attics of homes and buildings and/or on vertical surfaces whereat it is affixed with an adhesive such as in filling vertical stud wall cavities.

The conveying system 50 includes an air generating device or blower preferably of the positive pressure type having an air vacuum inlet 54 and an air outlet 56. Outlet 56 is connected to an air duct 58 which in turn is connected to the inlet 64 of the fibrous insulation feeder 60 through a directional air check valve 62. A velocity sensor 66, preferably in the form of a metering orifice as more fully described hereinbelow, is provided between the blower 52 and feeder 60 as shown. A conveying air flow stream is thus provided by blower 52 at the blower outlet 56 through air duct 58, velocity sensor 66, and directional check valve 62, to the inlet 64 of feeder 60. The air flow stream in duct 58 is in the direction as indicated by arrow 68.

The fibrous insulation feeder 60 includes a product inlet 70 and an air and product mixture outlet 72 connected to a conveying hose 74. Conveying hose 74 is extended as needed for reaching the location whereat the fibrous insulation material is applied. Accordingly, fibrous insulation material is provided through the product inlet 70 and is selectively introduced or mixed into the air flow stream entering at inlet 64 and such that an air and product mixture exits through outlet 72 and is conveyed through conveying hose 74 to the location whereat the insulation is applied by the operator.

Feeder 60 is provided with a slide gate 76 which is selectively slideable into and out of the product inlet 70 so as to thereby selectively decrease and increase the opening of the product inlet 70 and so as to thereby selectively vary the rate at which fibrous insulation material is fed into the air flow stream and out through the feeder outlet 72. An electronically controlled actuator 78 is connected to the slide gate 76 and is adapted to automatically slide the slide gate into and out of the product inlet opening 70. Actuator 78 is connected and electronically controlled via the control lines 80 connected to the programmable logic controller (PLC) 82. Accordingly, the rate at which fibrous insulation material is introduced into the air flow stream is selectively automatically controlled by the actuator 78 in response to electronic signals received from the PLC 82.

Figure 4:
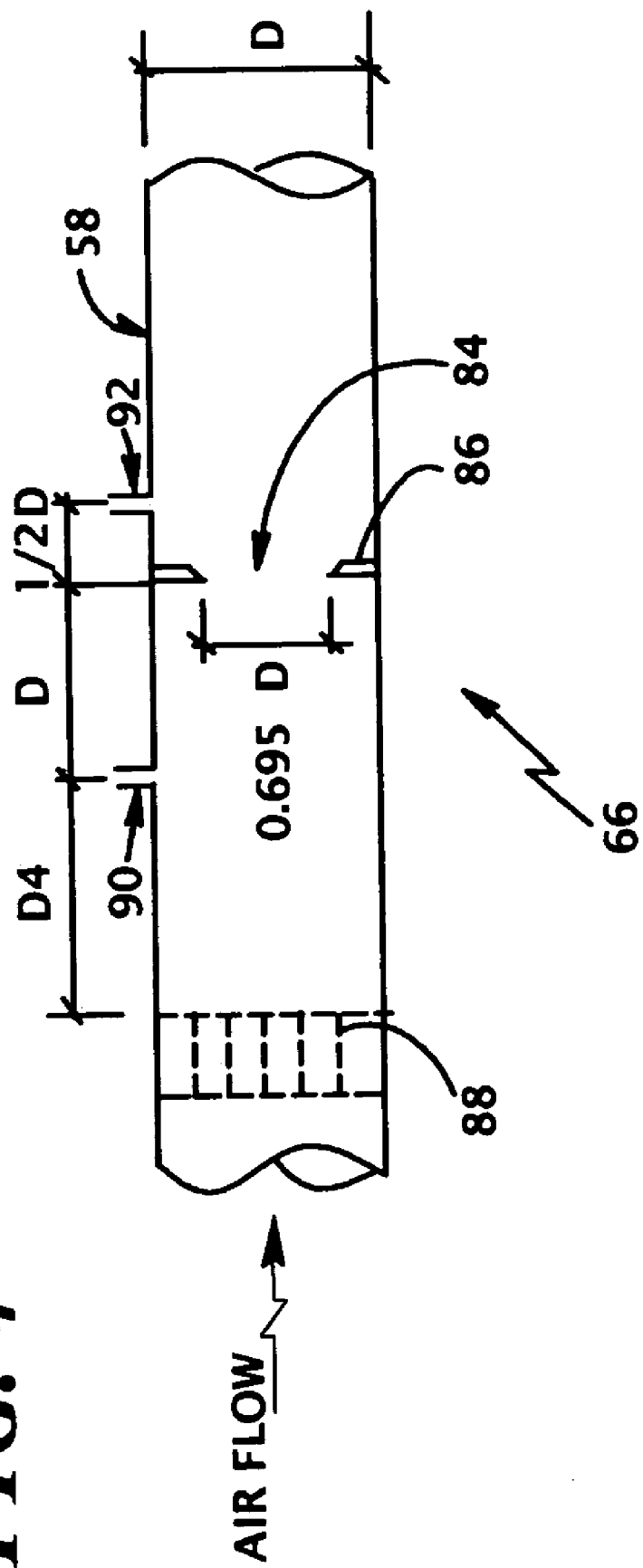
FIG. 4 is a schematic view of an orifice meter for sensing air flow stream velocity in the conveying and vacuuming systems of FIGS. 2 and 3; and, FIG. 5 is a schematic view of a mechanical vane velocity sensor for sensing velocity and adjusting the air flow stream in the conveying and vacuum systems of FIGS. 2 and 3.

As best seen in FIG. 4, the preferred velocity sensor is an orifice meter type including a metering orifice 84 for creating a slight restriction in the air flow stream traveling through the air duct 58. Metering orifice 84 is preferably created using an annular ring 86 within duct 58. The preferred diameter D of duct 58 is about 4 inches and the preferred metering orifice opening is about 0.695 D. Downstream of the metering orifice 84, there are provided a plurality of fixed fins 88 for decreasing turbulence and providing substantially laminar flow of the air flow stream through the metering orifice 84. Preferably, fins 88 are located a distance of about 5 D downstream from the metering orifice 84.

A high pressure opening 90 is provided upstream of the metering orifice 84 at a distance of about D from metering orifice 84, and a low pressure opening 92 is provided downstream of the metering orifice 84 at a distance of about ½ D from the metering orifice 84. As best seen in FIG. 2, high pressure opening 90 is connceted through pulsation or dampening chamber 94 to the differential pressure transducer 96, and a low pressure opening 92 is also connected to the differential pressure transducer through the pulsation or dampening chamber 98. Chambers 94 and 98 dampen any pressure surges that may be provided in the duct 58. Differential pressure transducer 96 thus compares the pressure signals received from chambers 94 and 98 and provides an electronic signal to the PLC 82 through electronic lines 100 representative of the air flow velocity through duct 58. A high pressure transducer 102 is also provided and is connected to the high pressure pulsation or dampening chamber 94 and provides an electronic signal to PLC 82 through the electronic lines 104 representative of the pressure in duct 58 at the high pressure opening 90.

Between blower 52 and feeder 60 and upstream of the velocity sensor 66, there is provided an air valve 106 connected between the air duct 58 and the atmosphere. Air valve 106 is automatically controlled with a motor or actuator 108 which in turn is connected and controlled by PLC 82 through electronic lines 110. Accordingly, air valve 106 is selectively opened and closed and is selectively automatically controlled for allowing a desired rate of air flow therethrough to exit to the atmosphere and so as to thereby selectively decrease and thus adjust and control the air flow traveling through the duct 58 and velocity sensor 66 and to the feeder 60.

In an alternate embodiment, blower 52 is a variable speed blower rather than a fixed speed, and PLC 82 is connected thereto via electronic lines 111 and provides control signals for selectively adjusting the speed of blower 52 and thereby selectively adjusting the air flow stream velocity being provided to duct 58 and feeder 60.

The conveying system 50 further includes a pressure relief valve 112 connected between the duct 58 upstream of the blower 52 and to the atmosphere. Pressure relief valve 112 allows air from the air flow stream in duct 58 to escape to the atmosphere in the event a predetermined pressure is exceeded, such as in the event a blockage or plugging occurs upstream therefrom. Additionally, a touch screen control panel 114 is preferably provided and is connected to the PLC 82 for allowing the operator to readily and easily control the desired conveying air flow stream velocity, the rate at which the fibrous insulation material is introduced into the air flow stream, etc. In the preferred embodiment, PLC 82 is a Direct Logic or Allen Bradley device and the preferred operator interface is an EZ Touch or Allen Bradley touch screen control panel 114.

In operation and use of the fibrous insulation conveying system 50, the operator merely sets the desired conveying air flow velocity and the desired insulation feed rate and the PLC 82 is programmed to continuously monitor the input velocity and pressure signals from transducers 96 and 102 and output control signals to the actuator 78 and actuator 108 and/or to blower 52 for providing the desired air flow velocity and insulation feed rate. In this regard, PLC 82 monitors the air flow stream velocity via the output of transducer 96 representative of the actual velocity and compares the actual air flow stream velocity with a desired air stream velocity and provides a corrective output signal to the actuator 108 in response to a differential between the actual and the desired air flow stream velocities such that actuator 108 will selectively open or close by a desired amount for selectively allowing air flow to bleed through the air valve 106 to the atmosphere and thereby selectively continuously adjust the air flow stream being provided to the feeder 60. It is noted that, in some applications, the output of pressure transducer 102 representative of the pressure in the air flow stream is continuously compared with a desired air pressure and, in response to a differential pressure between the actual and desired pressures, actuator 108 is controlled by the PLC 82 for adjusting and continuously providing the desired pressure within duct 58 and in the air flow stream traveling therethrough.

Similarly, the rate of introducing fibrous insulation material is adjusted as needed by comparing the output of pressure transducer 102 representative of the pressure in the air flow stream in duct 58 with a desired pressure and, in response to a differential therebetween, providing a control signal from PLC 82 to actuator 78 for selectively sliding slide gate 76 and continuously adjusting the fibrous insulation feed rate. It is noted that it is sometimes desirable to adjust the insulation feed rate in response to a differential between the actual and desired velocities in the air flow stream and, in this regard, PLC 82 is further programmed to also provide a control signal to actuator 78 and thereby continuously adjust the slide gate 76 and the insulation feed rate in response to such differential between the actual and desired velocities of the air flow stream.

In another embodiment as shown in FIG. 5, the air flow velocity sensor is in the form of a mechanical sensing vane 116 in the air flow stream within duct 58 and pivotally connected at pivot point or axis 118. Vane 116 is attached to arm 120 such that arm 120 also pivots about pivot point 118 along with sensing vane 116. A spring 122 is connected between the arm 120 and a spring load adjustment mechanism 124. Adjustment mechanism 124 provides selective adjustment of the spring 122 connection thereto as indicated by arrows 126 so as to selectively increase or decrease the spring force being applied to arm 120 and vane 116 and, thus, selectively increase and decrease the resistive force of vane 116 against the air flow stream traveling through duct 58.

An air valve 128 is connected between duct 58 and the atmosphere and includes a butterfly disk 130 pivotally connected so as to pivot about pivot point or axis 132. An arm 134 is connected to butterfly disk 130 so as to pivot therewith, and a connecting arm 136 is pivotally connected between the arm 134 and the vane arm 120. Accordingly, pivotal movement of vane 116 causes a proportional pivotal movement of the butterfly disk 130. As shown, as the air flow stream velocity in duct 58 increases causing vane 116 to move upwardly and pivot about axis 118 in a counter-clockwise direction, arm 120 is caused to move against the force of spring 122 and causing the butterfly disk 130 to proportionally open and allow more air flow through the air valve 128 to escape to the atmosphere thereby decreasing the air flow stream velocity through duct 58. Similarly, as the air flow stream velocity decreases causing vane 116 to move downwardly and pivot clockwise about axis 118, the butterfly disk 130 is in turn caused to further close off air valve 128 decreasing the flow therethrough to the atmosphere and thereby increasing the air flow stream velocity traveling through duct 58 and to feeder 60. Further, by selectively adjusting the spring load adjustment mechanism 124 and thus the spring force being applied to the vane arm 120, the velocity of the air flow stream traveling through duct 58 is also selectively adjustable.

It is noted that other air flow velocity sensors that could also be used include paddle wheels, rotary vane and turbine.

Figure 3:
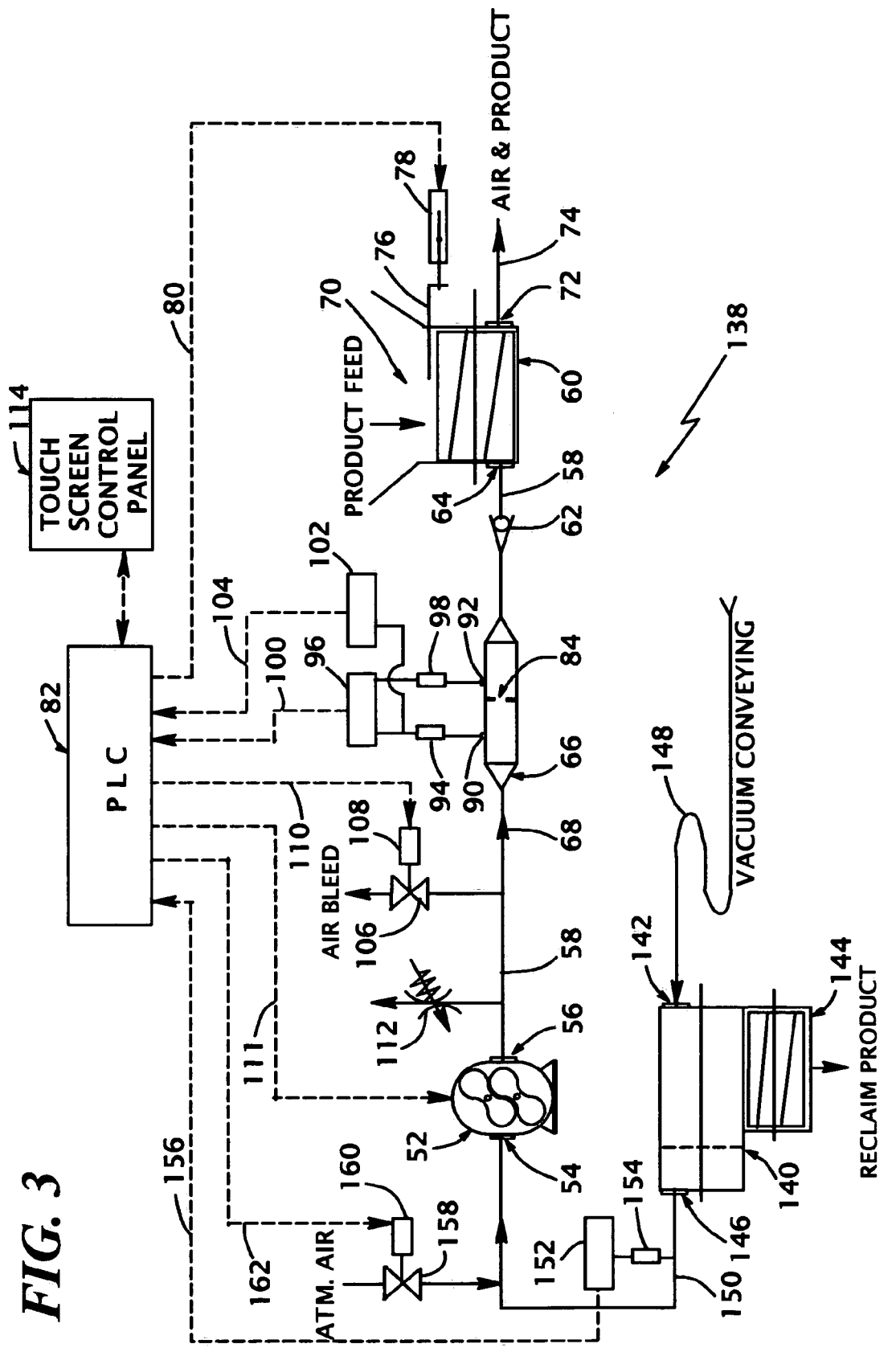
FIG. 3 is a schematic diagram of a fibrous insulation material conveying and vacuuming system constructed in accordance with the principles of the present invention.

Referring now more particularly to FIG. 3, there is shown a combined fibrous insulation conveying and vacuuming apparatus generally designated by the numeral 138. Apparatus 138 includes a fibrous insulation material separator 140 having an air and material mixture inlet 142, a fibrous insulation material outlet 144 and a clean air outlet 146. A vacuum hose 148 is connected to the air and material mixture inlet 142 and is extended by the operator to a distance as needed whereat excess fibrous insulation material can be vacuumed for reuse. Separator 140 causes separation of the air and vacuumed fibrous insulation material such that the reclaimed insulation exits at the material outlet 144 for reuse as desired, and substantially clean air is provided at the air outlet 146. Air outlet 146 is connected to the air vacuum inlet 54 via a vacuum duct 150. Accordingly, blower 52 also provides an air vacuum stream through vacuum duct 150, separator 140 and vacuum hose 148 for vacuuming excess fibrous insulation material and separating the same for reuse.

A vacuum transducer 152 is connected to the air vacuum stream in the vacuum duct 150 through the pulsation or dampening chamber 154. Dampening chamber 154 dampens vacuum pressure surges that may be created by the blower 52, separator 140 and/or other components of the system. Vacuum transducer 152 provides an electronic signal to PLC 82 through electronic lines 156 representative of the vacuum in the air vacuum stream within vacuum duct 150.

An air vacuum valve 158 is provided and is connected between vacuum duct 150 leading to the blower inlet 54 and the atmosphere. A motor or actuator 160 is connected to air vacuum valve 158 for selective automatic control thereof. Actuator 160 is electronically controlled by PLC 82 via electronic lines 162.

A vacuum relief valve 164 is also provided and is connected between the vacuum duct 150 leading to blower inlet 54 and the atmosphere. Vacuum relief valve 164 selectively provides atmospheric air to the air blower 52 in the event a predetermined vacuum is exceeded, such as in the event a blockage or other plugging occurs in the separator 140 and/or the vacuum hose 148.

In operation, when the vacuum system is not in use, air vacuum valve 158 is fully open thereby allowing atmospheric air to freely be provided to the blower 52 for thereby providing a conveying air flow stream through duct 58 as needed. When the operator desires to vacuum fibrous insulation material, he merely interfaces with the touch screen thereby causing the PLC 82 to send a control signal through electronic lines 162 to actuator 160 and causing air vacuum valve 158 to close. An air vacuum stream is thus provided through the vacuum hose 148, separator 140, vacuum duct 150 to the inlet 54 of blower 52 for thereby allowing the operator to vacuum fibrous insulation material as desired.

During the vacuuming operation, PLC 82 continuously monitors the output from the vacuum transducer 152 representative of the vacuum in duct 150 and compares to a desired vacuum and selectively provides a control signal to actuator 160 for selectively allowing atmospheric air into the vacuum duct 150 and thereby continuously selectively adjust and maintain a desired vacuum to separator 140 while maintaining sufficient air flow into blower 52 for continuing proper supply of the conveying air flow stream to the insulation feeder 60. It is noted that PLC 82 is further programmed as may be desired for providing a control signal to actuator 160 and controlling vacuum valve 158 as needed also in response to the output from differential pressure transducer 96 representative of air flow stream velocity as well as the output from pressure transducer 102 representative of the pressure in the air flow stream.

While the invention has been described as having specific embodiments, it is understood that it is capable of further modification. This application is, therefore, intended to cover any variations, uses or adaptations of the invention following the general principles thereof and including such departures from the present disclosure as come within known or customary practice in the art to which this invention pertains and fall within the limits of the appended claims.

What is claimed is:

1. A method of conveying fibrous insulation material comprising the steps of:
   providing an air flow stream;
   selectively introducing fibrous insulation material into the air flow stream whereby the material can be selectively conveyed for application as insulation;
   sensing the actual air flow stream velocity;
   comparing the actual air flow steam velocity with a desired air stream velocity and selectively adjusting the air flow stream in response to a differential between the actual and the desired air flow stream velocities; and
   wherein during the step of adjusting the air flow stream, a portion of the air stream is selectively allowed to escape to the atmosphere.

2. The method of claim 1 further comprising the step of selectively adjusting the rate of introducing fibrous insulation material to the air flow stream in response to a differential between the actual and desired air flow stream velocities.

3. The method of claim 1 further comprising the step of sensing the actual pressure in the air flow stream and comparing the actual pressure in the air flow stream with a desired pressure and selectively adjusting the rate of introducing fibrous insulation material into the air flow stream.

4. The method of claim 1 wherein a variable speed blower provides the air flow stream and wherein, during the step of adjusting the air flow stream, the blower speed is selectively adjusted.

5. The method of claim 1 wherein a blower provides the air flow stream and also provides an air vacuum stream, and further comprising the steps of vacuuming fibrous insulation material with said air vacuum stream and separating the vacuumed material from the air vacuum stream prior to said air vacuum steam entering said blower.

6. The method of claim 5, further comprising the step of selectively drawing atmospheric air into the air vacuum stream upstream of the blower and downstream of the separator in response to a differential between the actual and desired air flow stream velocities.

7. The method of claim 5, further comprising the step of selectively drawing atmospheric air into the air vacuum stream upstream of the blower and downstream of the separator whereby an air vacuum stream is selectively provided through the separator for vacuuming fibrous insulation material.

8. The method of claim 1 wherein a metering orifice is provided in the air flow stream upstream of selectively introducing the fibrous insulation material to the air flow stream, and further comprising the steps of measuring the air stream pressure downstream and upstream of the metering orifice and determining the actual air flow steam velocity by comparing the values of the downstream and upstream air flow stream pressures.

9. The method of claim 1 wherein a sensing vane is provided in the air flow stream upstream of selectively introducing fibrous insulation material to the air flow stream and further comprising the step of measuring the deflection of the sensing vane, thereby sensing the actual air flow stream velocity.

10. The method of claim 1 wherein, during the step of adjusting the air flow stream, a portion of the air stream is selectively allowed to escape to the atmosphere, and further wherein a metering orifice is provided in the air flow stream upstream of selectively introducing the fibrous insulation material to the air flow stream, and further comprising the steps of measuring the air stream pressure downstream and upstream of the metering orifice and determining the actual air flow stream velocity by comparing the values of the downstream and upstream air flow stream pressures.

11. The method of claim 10 further comprising the step of selectively adjusting the rate of introducing fibrous insulation material to the air flow stream in response to a differential between the actual and desired air flow stream velocities.

12. The method of claim 10 further comprising the step of sensing the actual pressure in the air flow stream and comparing the actual pressure in the air flow stream with a desired pressure and selectively adjusting the rate of introducing fibrous insulation material into the air flow stream.

13. The method of claim 10 wherein a blower provides the air flow stream and also provides an air vacuum stream, and further comprising the steps of vacuuming fibrous insulation material with said air vacuum stream and separating the vacuumed material from the air vacuum stream prior to said air vacuum stream entering said blower.

14. The method of claim 13 further comprising the step of selectively drawing atmospheric air into the air vacuum stream upstream of the blower and downstream of the separator in response to a differential between the actual and desired air flow stream velocities.

15. The method of claim 10 further comprising the step of providing a programmable logic controller and a touch screen interface for selectively controlling said method steps.

16. The method of claim 1 further comprising the step of providing a programmable logic controller for controlling said method steps.

17. The method of claim 16 further comprising the step of providing a touch screen interface with said programmable logic controller allowing an operator to selectively control said method steps.

18. A method of conveying fibrous insulation material comprising the steps of:
   providing an air flow stream;
   selectively introducing fibrous insulation material into the air flow stream whereby the material can be selectively conveyed for application as insulation;
   sensing the actual pressure in the air flow stream;
   comparing the actual air flow stream pressure with a desired air stream pressure and selectively adjusting the air flow stream in response to a differential between the actual and the desired air flow stream pressures; and
   wherein, during the step of adjusting the air flow stream, a portion of the air stream is selectively allowed to escape to the atmosphere.

19. The method of claim 18 further comprising the step of selectively adjusting the rate of introducing fibrous insulation material to the air flow stream in response to a differential between the actual and desired air flow stream pressures.

20. The method or claim 18 wherein a variable speed blower provides the air flow stream and wherein, during the step of adjusting the air flow stream, the blower speed is selectively adjusted.

21. The method of claim 18 wherein a blower provides the air flow stream and also provides an air vacuum stream, and further comprising the steps of vacuuming fibrous insulation material with said air vacuum stream and separating the vacuumed material from the air vacuum stream prior to said air vacuum stream entering said blower.

22. The method of claim 21, further comprising the step of selectively drawing atmospheric air into the air vacuum stream upstream of the blower and downstream of the separator in response to a differential between the actual and desired air flow steam pressures.

23. The method of claim 21, further comprising the step of selectively drawing atmospheric air into the air vacuum stream upstream to the blower and downstream of the separator whereby an air vacuum stream is selectively provided through the separator for vacuuming fibrous insulation material.

24. The method of claim 18 further comprising the step of providing a programmable logic controller for controlling said method steps.

25. The method of claim 24 further comprising the step of providing a touch screen interface with said programmable logic controller allowing all operator to selectively control said method steps.

* * * * *